US007067993B2

(12) United States Patent
Youle

(10) Patent No.: US 7,067,993 B2
(45) Date of Patent: Jun. 27, 2006

(54) LIGHT SOURCE CONTROL SYSTEM

(75) Inventor: Gordon David Youle, Ottawa (CA)

(73) Assignee: OZ Optics Ltd., Nepean (CA)

( * ) Notice: Subject to any disclaimer, the term of this patent is extended or adjusted under 35 U.S.C. 154(b) by 0 days.

(21) Appl. No.: 11/058,286

(22) Filed: Feb. 16, 2005

(65) Prior Publication Data

US 2005/0200311 A1 Sep. 15, 2005

Related U.S. Application Data

(60) Provisional application No. 60/545,531, filed on Feb. 19, 2004.

(51) Int. Cl.
*H05B 37/02* (2006.01)
*G05F 1/00* (2006.01)
*H01S 3/13* (2006.01)

(52) U.S. Cl. .................. 315/291; 315/308; 315/169.3; 372/29.015

(58) Field of Classification Search ................ 315/291, 315/158, 307–309, 169.3; 372/29.015, 29.014; 250/205; 345/16, 77
See application file for complete search history.

(56) References Cited

U.S. PATENT DOCUMENTS 5,111,531 A 5/1992 Grayson et al. .............. 706/23
5,485,545 A 1/1996 Kojima et al. ................ 706/23
5,740,324 A 4/1998 Mathur et al. ................ 706/16
6,349,023 B1 2/2002 Greenberg .................. 361/103
6,411,046 B1 6/2002 Muthu ........................ 315/309
6,449,574 B1 9/2002 Eryurek et al. ............... 702/99
6,667,869 B1 12/2002 Greenberg .................. 361/103
6,885,685 B1 * 4/2005 Hidaka et al. ......... 372/29.015
6,914,387 B1 * 7/2005 Sato et al. ............... 315/169.1
6,963,175 B1 * 11/2005 Archenhold et al. ........ 315/291
2004/0135522 A1 * 7/2004 Berman et al. ............. 315/291

* cited by examiner

*Primary Examiner*—Tuyet Vo
*Assistant Examiner*—Ephrem Alemu
(74) *Attorney, Agent, or Firm*—Jones, Tullar&Cooper, P.C.

(57) ABSTRACT

A system and method for controlling an optical light source is provided. A current source drives the light source, while the voltage across and the current through the light source is measured. The voltage and current are converted to digital signals and sent to a neural network, which generates a modeled optical output power of the light source and a modeled value of the optical wavelength. A control circuit receives the modeled optical output power and wavelength and sends a control signal to the current source to minimize the difference between the desired power output and the modeled output power. In addition, a control signal is sent to a Peltier driver to control the temperature of a Peltier cooler in order to increase or decrease the wavelength emitted by a laser diode.

8 Claims, 2 Drawing Sheets

LIGHT SOURCE CONTROL SYSTEM

CROSS REFERENCE TO RELATED APPLICATIONS

This application claims the benefit under 35 U.S.C. 119(e) of U.S. Provisional Application No. 60/545,531 filed Feb. 19, 2004.

BACKGROUND OF THE INVENTION

1. Field of the Invention

This invention relates to the control system for an optical light source through use of a neural network. Although primarily intended for the fiber optics industry, applications extend to any industry that requires a stable optical source.

2. Background Information

There are numerous types of light sources currently in existence. However, the intensity and wavelength of the light that is produced may vary, depending on parameters such as voltage across the light source, current flowing through the light source, and temperature of the light source. Methods exist to minimize effects caused by variations in these parameters, in either an open loop or closed loop configuration. In the closed loop configuration, a feedback or error signal is provided to a control system that minimizes the error. In the open loop configuration, such feedback is not provided.

Conventional methods use a temperature sensor that is physically removed from the light source to determine the temperature of the light source for the purpose of monitoring and control. This suffers from the disadvantage that there will always be a slight variance in the temperature of the detector and the temperature of the light source. Furthermore, in a conventional system the temperature sensor and light source will almost always have different thermal time constants, indicating that even a system with perfect steady-state temperature compensation may not give the desired results in response to a change in temperature.

Laser diode sources typically use a monitor photodiode. The output current of the monitor photodiode is commonly considered to be proportional to the optical output power of the laser. However, such a practice generates errors since non-linearity may be introduced by temperature dependencies.

U.S. Pat. No. 6,411,046 teaches a model of LED parameters for use in white light control. The '046 patent uses a model of the optical power and wavelength output from an array of light emitting diodes. The model is dependent on derived polynomial equations and on the temperature measured by a temperature sensor in thermal contact with a heatsink to which the LED's are attached. The patent controls the current to the LED's in order to increase or decrease the optical power emitted by different colored LED's. One skilled in the art would appreciate that minor errors in the coefficients of the polynomial equation could adversely affect the performance of the device.

A very different method of determining output temperature can be found in U.S. Pat. No. 6,449,574. A resistance temperature device (RTD) is used to determine process control device diagnostics. An RTD is a device that changes resistance with temperature, allowing information to be extracted by passing a known current through the RTD and measuring the voltage across the RTD. However, parasitic voltages within the circuit cause voltage variations, the error of which the '574 patent attempts to reduce. Nevertheless, due to the voltage measurement error, this method is less effective and would not work well for precise control of the output wavelength of a light source.

U.S. Patent Application No. 2002/0149895 teaches a closed loop system to control the power supplied to a resistive load. The system contains a regulator circuit that sends power impulses to a pulse train generator circuit. The output of the generator circuit is a heating pulse train, which can be used to determine the temperature of the load through a calculation. This temperature-out value is sent to a temperature comparison circuit, which provides control to disconnect the power source from the load if the temperature-out value reaches a maximum temperature limit. The patent provides for only on/off operation of the device, rather than variable control. Furthermore, the method is a first order approximation of the temperature and more accurate estimates may be required to provide precise control of the optical output power of the light source.

Related to the '895 application, U.S. Pat. No. 6,349,023 also teaches a power control system for an array of lights. The system uses a model to determine the temperature of the load by sensing a voltage proportional to the power in a resistive load. If necessary, the power source is disconnected from the load if the high temperature limit is reached. Although the system operates in real-time, analog components are used.

Regarding the application of neural networks, typical applications are shown in U.S. Pat. Nos. 5,740,324 and 5,485,545. The '324 patent teaches a method of system identification of a process, based on a neural network and applied to a heating system. The patent explains that system identification problems are caused by the approximation of system parameters. Using neural networks can reduce these estimation errors. A three-layer feed forward neural network with a back propagation learning rule is used as the preferred embodiment for the neural network. The inputs to the neural network are the input and output of the process, and the outputs of the neural network are estimates of model parameters, requiring no mathematical analysis in between. The method has two stages—in the first stage a mathematical model is used to generate training data and is implemented as a computer program. Training data comprises examples of open loop responses of the system to a step input with different parameter values. The second phase consists of using the neural network in a teaching mode wherein one or more parameters are identified. In this stage it is assumed that every desired output is known for each training input.

The '545 patent uses a conventional controller in parallel with a neural network controller. The neural network goes through a learning step by forcing its input/output pairs to match that of the conventional controller. The patent further applies the teachings to a voltage/reactive-power controller to maintain levels suitable for high speed operation without the need to approximate the power characteristics of the system. Relearning also takes place to allow the neural network to update itself in accordance with a system simulator.

U.S. Pat. No. 5,111,531 also teaches a process control method though use of a neural network. The neural network, when trained, predicts the value of an indirectly controlled process variable and can be implemented through an integrated circuit or a computer program. Directly controlled process variables are changed accordingly to cause the predicted value to approach a desired value. The system consists of fast-acting controllable devices for changing controllable process variables, a computer for storing and executing rules related to operation of the neural network and a neural network. Examples of fast-acting devices are power supplies that control electrical heating currents or motors connected to valves. The computer contains the process description database that defines the state of the multi-variable process. As well, the computer must execute the rules associated with each input neuron to establish the value of the input neuron and execute the rules associated with the output neurons for establishing the set point values to be applied to the fast-acting devices. Rules generated for input neurons can comprise averaging, filtering, combining and/or switching rules, while output neuron rules may comprise limit checking, weighing, scaling and/or ratio rules. The neural network goes through a training process whereby several training sets of input neuron and output neuron values captured from the process while it is in operation are presented to the neural network and a back propagation algorithm adjusts the interconnection between neurons. Although useful, the '531 patent only provides an approach to controlling complex multi-variable continuous manufacturing processes.

Regardless of the type of light source, there generally exists a relationship between the applied voltage, the current, the temperature of the source, the optical power produced, and the wavelengths of light produced. This relationship may be quite complex or poorly understood, but it nonetheless exists. One object of the present invention is to use a neural network to provide a novel means for employing the relationship between the various input and output parameters without requiring a detailed or complete knowledge of the nature of the relationship.

SUMMARY OF THE INVENTION

One aspect of the present invention relies on software, implemented by means of a neural network, to actively adjust a signal to drive a light source in order to maintain a constant optical power output. The invention is adaptable to different load-voltage relationships and can be used in either an open or closed loop system, with slightly different configurations. In addition, compensation for non-linearity is optionally provided by the control system.

Another aspect of the present invention provides an effective software implementation that actively adjusts the light source to maintain a constant optical power output and is more adaptable to different load-voltage relationships. The system is indirectly based on the temperature of the light source and does not require a physical temperature sensor for temperature measurement. Furthermore, since a conventional light source often requires significant time to stabilize when first turned on, the system dynamically adjusts the power levels to the desired value, even while the light source is warming up, which significantly reduces the time required to obtain a stable power level.

BRIEF DESCRIPTION OF THE DRAWINGS

The following description of the preferred embodiments will be better understood with reference to the attached drawings, in which.

DESCRIPTION OF THE PREFERRED EMBODIMENTS

The system of the present invention uses a neural network to develop a model of a light source. In order to use a neural network, a set of data must first be generated through what is known as a training period. The data set is obtained through several measurements of the optical output power and the wavelength of the light source under different conditions of applied voltage, current and temperature of the source. The data set is then used to train a neural network or adaptive system and develop a model.

To produce the data, various drive currents are applied through a light source, while the resulting voltage across the source and the optical power and wavelengths produced by the source are measured. Several measurements are performed as the temperature of the source is changed. Typically, measurements take place within an environmental chamber, although embodiments that incorporate a self-contained heating or cooling system such as a Peltier element may also be used to change the temperature of the optical source. By collecting data over the entire operating range of the device, a database is formed containing sets of data, where each data set shows the relationship between the parameters under specific conditions at the moment when the measurements were made.

The collected data sets are then used for training a neural network or other adaptive system in order to develop a model of the light source. With a suitably large number of sets of data and a suitable training interval, a model is created that replicates the performance of the actual source. When the training period has ended, the model of the light source is programmed into the control system.

The built-in model allows a control system to compensate for changes in output power or wavelength that occur with changes in temperature. While most conventional temperature compensation techniques rely on a separate temperature-sensing device such as a thermistor, the present invention uses the inherent voltage, current and temperature relationships of the light source itself, as incorporated into the model. The temperature characteristics of the light source are used for determining the temperature compensation that is required.

Figure 1:
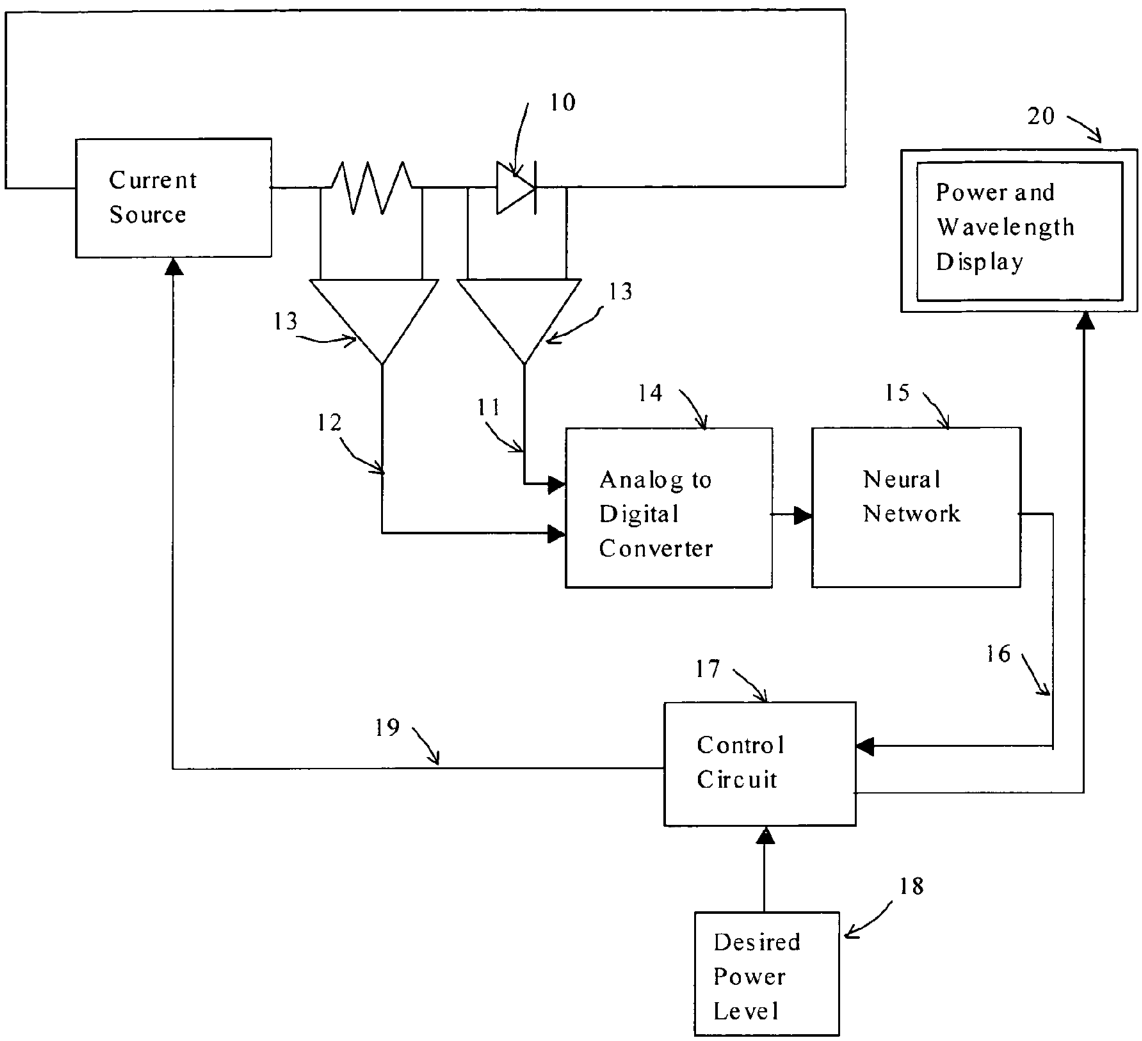
FIG. 1 is a typical configuration of the invention controlling a Light Emitting Diode.

In the preferred embodiment shown in FIG. 1, a light emitting diode (LED) 10 is used as the light source. Voltage 11 across the LED and current 12 through the LED are measured with instrumentation amplifiers 13 and passed through an Analog to Digital Converter (ADC) 14 to a neural network 15. The output 16 of the neural network is a modeled optical output power of the LED. The modeled value is fed to a control circuit 17 and the current flowing through the LED is changed to minimize the difference between the desired power output 18 and the modeled power output. The control circuit produces an LED current control signal 19. In this embodiment, the wavelength of the light cannot be controlled, but it is modeled and displayed as indicated at 20.

Figure 2:
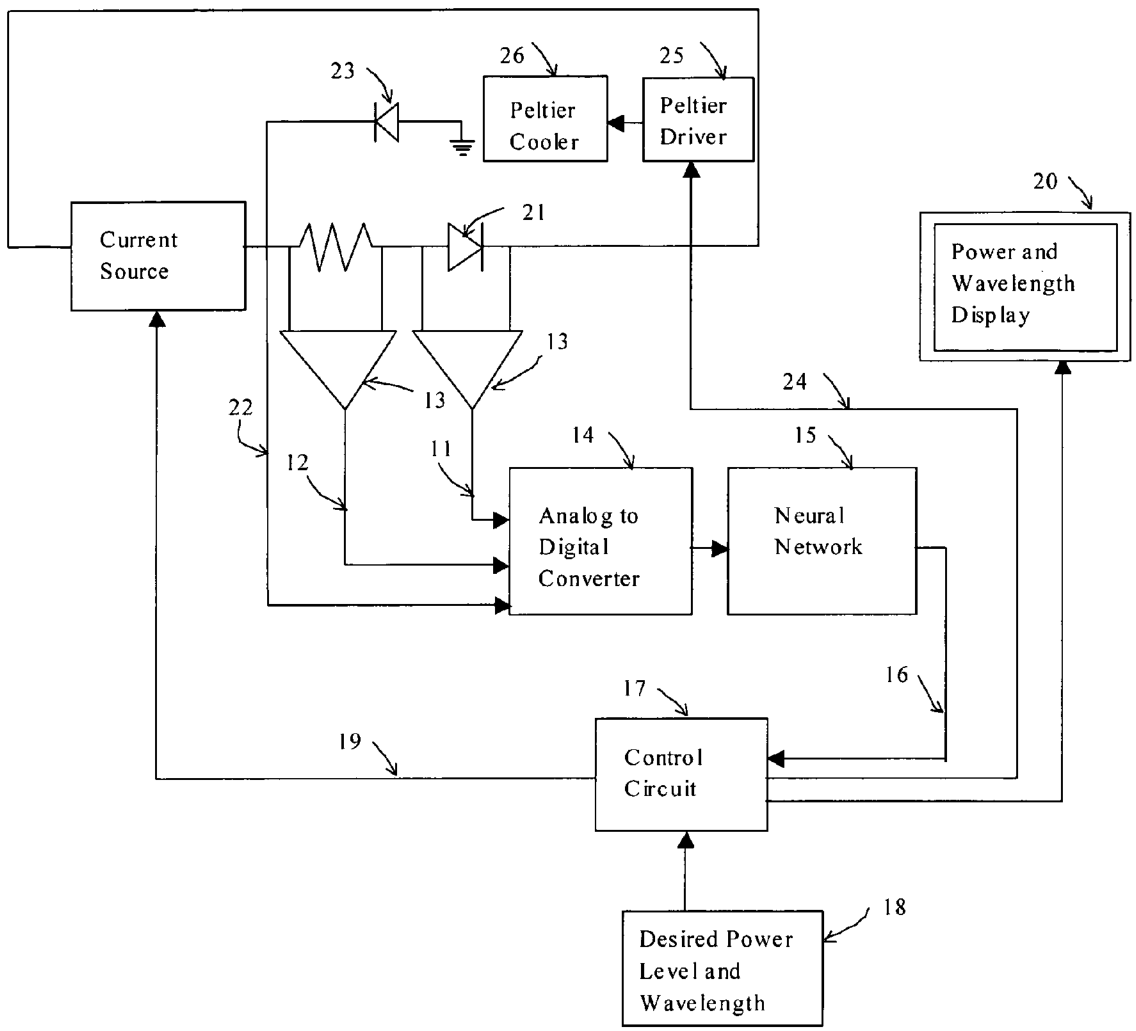
FIG. 2 is a typical configuration of the invention controlling a Laser Diode, including a Peltier driver and a Peltier cooler.

FIG. 2 uses a laser diode 21 as the light source. In this instance, the power 22 output from a monitoring photodiode 23 is also fed to the neural network, supplying additional information to the system. The neural network sends as an output 16 to the control circuit 17 a modeled optical output power and a modeled value of the optical wavelength. The control circuit 17 additionally provides a control signal 24 to a Peltier driver 25, which drives the Peltier cooler 26 to achieve the temperature required to produce the desired wavelength of light. The current to the Peltier cooler 26 is increased or decreased accordingly to increase or decrease the wavelength of the light emitted by the laser diode 21 until the modeled wavelength matches the desired wavelength. To prevent excessive overshoot of the temperature, the thermal time constants of the Peltier cooler and the optical source can be taken into account by either the control circuit 17 or the Peltier driver 25, although not necessary for operation. The output power and wavelength, as determined by the neural network model, are displayed for the user, as indicated at 20.

As an alternative in either embodiment of FIG. 1 or 2, a communication interface is used to pass the measured parameters to a host computer for further training of the neural network.

During operation, the model functions in parallel with the light source. The system measures the voltage across the source, current through the source, and optionally any feedback signals that may be available such as optical power from a monitoring photodiode or other detector. A separate temperature sensor may also be added to provide additional information to the neural or adaptive network. These parameters are fed into the model of the source, which then generates the modeled output power and/or output wavelengths. Based on the modeled outputs, the control system adjusts the drive signal (current or voltage) to reduce the difference between the modeled output and the desired output, which can be set under user control. Since the modeled output ideally is an exact replica of the actual output, the desired output will be achieved when the modeled output matches the desired output.

The wavelength of light produced by a source is highly dependent on the temperature of the source. By giving the neural network or adaptive system the capability to control the temperature of the source by means of a Peltier cooler or other temperature control device, the system is able to provide control over both power and wavelength. A complete model of the light source provides wavelength information of the output light to the user of the light source and updates are possible as the temperature of the source changes.

In actual practice, the neural or adaptive network may consist of smaller networks working in parallel, with each one trained for a specific function, such as modeling power or modeling wavelength.

Several variations can be incorporated into the above described preferred embodiments. In one embodiment, the data sets are produced by applying various voltages and measuring the current through the source as well as the optical power and wavelengths produced by the source. In addition, while the most common type of light source to be controlled by the invention will be a laser diode or light emitting diode, other light sources can also be used.

As another embodiment, one skilled in the art would appreciate that it is not necessary to measure the current through the laser diode or the LED if the current source is digitally programmable. For example, if the current source has a built-in digital to analog converter. In such a case, the digital control value for the current source is used as an input to the neural network instead of the measured current.

As another alternative, the training of the neural network or adaptive system need not take place within the control system of the light source. After data collection, the training of the neural network may be performed on a faster device, such as a personal computer, given that the neural network or adaptive system of the faster computer mimics the operation of the end system. Once the training has been completed, the appropriate parameters are downloaded into the control system of the light source.

One skilled in the art would appreciate that there may be several different forms of neural networks suitable for this system. One example is a network with one input layer that measures current, voltage and photodiode output, with one hidden layer and with one output of either optical power or wavelength. Thus, two such neural networks operating together form the required basis; one network modeling optical power and the other modeling wavelength. Another example is a neural network having two hidden layers.

What is claimed is:

1. An apparatus for controlling an optical light source, comprising:
- a light source;
- a current source for driving the light source;
- means for measuring voltage across the light source;
- means for measuring current through the light source;
- means for converting the voltage and current to digital signals;
- a neural network receiving the digital signals as inputs, the neural network generating a modeled optical output power of the light source; and
- a control circuit for receiving the modeled optical output power as an input, and for sending a first control signal to the current source to minimize a difference between a desired power output and the modeled output power.

2. The apparatus of claim 1 further comprising a monitoring photodiode, the output of which is also fed to the neural network.

3. The apparatus of claim 2 further comprising a Peltier driver; and a Peltier cooler driven by the Peltier driver, the neural network generating a modeled value of optical wavelength as a second output, and the control circuit receiving the second output and generating a second control signal that is sent to the Peltier driver to control the Peltier cooler.

4. A method for controlling an optical light source controlled by a current source, comprising the following steps:
- generating a set of data through a training period;
- training a neural network to develop a model with the set of data;
- measuring a voltage across the light source;
- measuring a current through the light source;
- converting the voltage and current to digital signals;
- sending the digital signals to a neural network that generates a modeled optical output power of the light source;
- comparing the modeled optical output power with a desired power output; and
- sending a control signal to the current source to minimize a difference between the desired power output and the modeled optical output power.

5. The method of claim 4 wherein the set of data is generated by measuring the optical output power of the light source under different conditions of applied voltage, current and temperature of the source.

6. The method of claim 5 wherein the wavelength of the light source is also measured.

7. The method of claim 6 further comprising the step of sending an output of a monitoring photodiode to the neural network.

8. The method of claim 7 wherein the neural network generates a modeled value of optical wavelength as a second output control signal and the method further comprises the steps of
- comparing the modeled value of optical wavelength with a desired wavelength to generate a second control signal; and
- producing a desired wavelength of light by controlling an ambient temperature with a Peltier cooler controlled by a Peltier driver that receives the second control signal as an input.

* * * * *